United States Patent
Sachs et al.

(10) Patent No.: US 10,104,607 B2
(45) Date of Patent: Oct. 16, 2018

(54) METHOD AND NODE FOR SELECTING A CAPILLARY NETWORK GATEWAY

(71) Applicant: Telefonaktiebolaget LM Ericsson (publ), Stockholm (SE)

(72) Inventors: Joachim Sachs, Sollentuna (SE); Ari Keränen, Helsinki (FI); Johan Rune, Lidingö (SE); Anders E. Eriksson, Kista (SE); Francesco Militano, Stockholm (SE); Nicklas Beijar, Kirkkonummi (FI); Vlasios Tsiatsis, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/116,899

(22) PCT Filed: Feb. 21, 2014

(86) PCT No.: PCT/SE2014/050215
§ 371 (c)(1),
(2) Date: Aug. 5, 2016

(87) PCT Pub. No.: WO2015/126295
PCT Pub. Date: Aug. 27, 2015

(65) Prior Publication Data
US 2017/0171806 A1    Jun. 15, 2017

(51) Int. Cl.
*H04W 48/20*    (2009.01)
*H04W 4/70*     (2018.01)
(Continued)

(52) U.S. Cl.
CPC ............. *H04W 48/20* (2013.01); *H04W 4/70* (2018.02); *H04W 88/04* (2013.01); *H04W 4/80* (2018.02); *H04W 84/18* (2013.01); *H04W 88/16* (2013.01)

(58) Field of Classification Search
CPC .................................... H04W 48/20
See application file for complete search history.

(56) References Cited

U.S. PATENT DOCUMENTS 9,338,070 B2    5/2016    Singh
9,730,176 B2    8/2017    Starsinic et al.
(Continued)

FOREIGN PATENT DOCUMENTS

EP    2306766 A1    4/2011
EP    2309790 A2    4/2011
(Continued)

OTHER PUBLICATIONS

Kim et al., Effective M2M gateway selection algorithms for geographical region-based query, Published in: Information and Communication Technology Convergence (ICTC), 2010 International Conference on Date of Conference: Nov. 17-19, 2010 Date Added to IEEE Xplore: Dec. 23, 2010.*
(Continued)

*Primary Examiner* — Gary Mui
(74) *Attorney, Agent, or Firm* — Withrow & Terranova, PLLC

(57) ABSTRACT

The disclosure relates to a method for selecting a capillary network gateway for a machine device of a capillary network. The method comprises: acquiring a respective bearer service parameter for two or more capillary network gateways of the capillary network, each capillary network gateway being capable of data exchange between the machine device and a wireless network, and wherein the bearer service provides a backhaul connection in the wireless network; and selecting, for the machine device, a capillary network gateway based on the bearer service parameters. The disclosure relates to a corresponding node, computer program and computer program product.

25 Claims, 4 Drawing Sheets

(51) Int. Cl.
*H04W 88/04* (2009.01)
*H04W 88/16* (2009.01)
*H04W 4/80* (2018.01)
*H04W 84/18* (2009.01)

(56) References Cited

U.S. PATENT DOCUMENTS

| | | |
|---|---|---|
| 9,820,189 B2 | 11/2017 | Nova Diaz et al. |
| 2007/0047561 A1 | 3/2007 | Chen et al. |
| 2008/0019313 A1* | 1/2008 | Vogety ............... H04W 8/12 370/330 |
| 2009/0041039 A1* | 2/2009 | Bear .................. H04L 45/38 370/401 |
| 2009/0175204 A1* | 7/2009 | Kim .................. H04L 45/18 370/256 |
| 2011/0081903 A1 | 4/2011 | Cai et al. |
| 2011/0228750 A1 | 9/2011 | Tomici et al. |
| 2012/0113971 A1* | 5/2012 | Giaretta ............. H04W 48/20 370/338 |
| 2012/0128090 A1* | 5/2012 | Seok ................. H04W 48/20 375/267 |
| 2012/0287854 A1* | 11/2012 | Xie .................. H04W 4/005 370/328 |
| 2013/0070775 A1* | 3/2013 | Qu .................. H04L 12/1407 370/401 |
| 2013/0142059 A1 | 6/2013 | Di Girolamo et al. |
| 2013/0155948 A1 | 6/2013 | Pinheiro et al. |
| 2013/0188515 A1 | 7/2013 | Pinheiro et al. |
| 2013/0203412 A1 | 8/2013 | Starsinic et al. |
| 2013/0311640 A1 | 11/2013 | Gleixner et al. |
| 2013/0322329 A1* | 12/2013 | Visuri ............... H04W 48/16 370/328 |
| 2014/0016466 A1 | 1/2014 | Calvanese Strinati |
| 2014/0064232 A1* | 3/2014 | Chang ............... H04W 48/18 370/329 |
| 2014/0112301 A1* | 4/2014 | Shu ................. H04W 8/245 370/329 |
| 2014/0129672 A1* | 5/2014 | Singh ................ H04L 43/08 709/217 |
| 2014/0167929 A1* | 6/2014 | Shim ................. G08C 17/02 340/12.5 |
| 2014/0328254 A1* | 11/2014 | Lim ................. H04W 36/0055 370/328 |
| 2015/0050954 A1* | 2/2015 | Kameno ............. H04W 48/18 455/509 |
| 2015/0256349 A1* | 9/2015 | Kim ................ H04L 12/1407 370/259 |
| 2015/0264668 A1* | 9/2015 | Takehana ............ H04W 4/005 370/329 |
| 2016/0065472 A1 | 3/2016 | Gleixner et al. |
| 2016/0283191 A1 | 9/2016 | Lu |
| 2016/0353227 A1* | 12/2016 | Sachs ................. H04W 4/005 |
| 2016/0353228 A1* | 12/2016 | Sachs ................. H04W 4/008 |
| 2016/0353326 A1 | 12/2016 | Nova Diaz et al. |
| 2017/0013059 A1 | 1/2017 | Keranen et al. |
| 2017/0048792 A1* | 2/2017 | Sachs ................. H04W 48/18 |
| 2017/0055310 A1* | 2/2017 | Sachs ................. H04W 4/005 |
| 2017/0071024 A1* | 3/2017 | Sachs ................. H04W 4/005 |
| 2017/0085490 A1 | 3/2017 | Sachs et al. |
| 2017/0303177 A1 | 10/2017 | Ngounou |
| 2017/0311304 A1 | 10/2017 | Lu |

FOREIGN PATENT DOCUMENTS

| | | |
|---|---|---|
| WO | 2011112683 A1 | 9/2011 |
| WO | 2012136005 A1 | 10/2012 |
| WO | 2013157577 A1 | 10/2013 |
| WO | 2015126294 A1 | 8/2015 |
| WO | 2015126296 A1 | 8/2015 |

OTHER PUBLICATIONS

Beijar et al.; Gateway selection in capillary networks; Published in: Internet of Things (IOT), 2015 5th International Conference on the; Date of Conference: Oct. 26-28, 2015; Date Added to IEEE Xplore: Dec. 17, 2015 (Year: 2015).*

Kim et al.; Effective M2M gateway selection algorithms for geographical region-based query; Published in: Information and Communication Technology Convergence (ICTC), 2010 International Conference on; Date of Conference: Nov. 17-19, 2010; Date Added to IEEE Xplore: Dec. 23, 2010 (Year: 2010).*

Author Unknown, "Machine-to-Machine communications (M2M); Functional architecture," Draft, Technical Specification 102 690, Version <0.9.6>, European Telecommunications Standards Institute, Dec. 2010, 191 pages.

Author Unknown, "Technical Specification Group Services and System Aspects; Architecture enhancements to facilitate communications with packet data networks and applications (Release 11)," Technical Specification 23.682, Version 11.3.0, 3GPP Organizational Partners, Dec. 2012, 29 pages.

Author Unknown, "Technical Specification Group Services and System Aspects; Generic Authentication Architecture (GAA); Generic Bootstrapping Architecture (GBA) (Release 12)," Technical Specification 33.220, Version 12.0.0, 3GPP Organizational Partners, Mar. 2013, 92 pages.

International Search Report and Written Opinion for International Patent Application No. PCT/SE2014/050215, dated Feb. 5, 2015, 16 pages.

International Search Report and Written Opinion for International Patent Application No. PCT/SE2014/050216, dated Feb. 3, 2015, 10 pages.

International Search Report and Written Opinion for International Patent Application No. PCT/SE2014/050214, dated Dec. 17, 2014, 11 pages.

Non-Final Office Action for U.S. Appl. No. 15/116,931, dated Dec. 1, 2017, 17 pages.

Non-Final Office Action for U.S. Appl. No. 15/116,962, dated Jan. 4, 2018, 9 pages.

Notice of Allowance for U.S. Appl. No. 15/116,931, dated Jun. 8, 2018, 7 pages.

Final Office Action for U.S. Appl. No. 15/116,962, dated May 4, 2018, 12 pages.

* cited by examiner

METHOD AND NODE FOR SELECTING A CAPILLARY NETWORK GATEWAY

This application is a 35 U.S.C. § 371 national phase filing of International Application No. PCT/SE2014/050215, filed Feb. 21, 2014, the disclosure of which is incorporated herein by reference in its entirety.

TECHNICAL FIELD

The technology disclosed herein relates generally to the field of capillary networks, and in particular to selecting a capillary network gateway in such capillary network.

BACKGROUND

A currently foreseen development of communication in cellular networks involves numerous small autonomous devices, which transmit and receive only small amounts of data (or are polled for data) occasionally, e.g. once a week or once per minute. These devices may be sensors or actuators of different kinds, which communicate with application servers within or outside a cellular network. The application servers configure the devices and receive data from them. Hence, this type of communication is often referred to as machine-to-machine (M2M) communication and the devices may be denoted machine devices (MDs). In the 3GPP standardization such communication and devices are denoted Machine Type Communication (MTC) and Machine Type Communication devices (MTC devices), respectively. In the following, such autonomous device is denoted machine device (MD).

In view of the nature of MDs and their assumed typical uses it follows that they will often have to be very energy efficient, as external power supplies will typically not be available and since it is neither practically nor economically feasible to frequently replace or recharge their batteries. In some scenarios the MDs may not even be battery powered, relying instead on energy harvesting, i.e. gathering energy from the environment, opportunistically utilizing (the often very limited) energy that may be tapped from sun light, temperature gradients, vibrations, etc.

So far focus has been directed to MDs being directly connected to the cellular network via the radio interface of the cellular network. However, a scenario which is likely to be more prevalent is that MDs connect to the cellular network via a gateway. In such scenarios the gateway acts like a UE towards the cellular network while maintaining a local network, typically based on a short range radio technology towards the MDs. Such a local network, which in a sense extends the reach of the cellular network (to other radio technologies but not necessarily in terms of radio coverage), has been coined capillary network and the gateway connecting the capillary network to the cellular network is herein referred to as a capillary network gateway (CGW). FIG. 1 illustrates such capillary network 1, comprising a number of machine devices $2_1$, $2_2$, $2_3$ communicating with the CGW 4 over a first air interface 3 typically implementing a short range radio technology. The CGW 4 is in turn communicating with a node of the cellular network 5 over a second air interface 6. An application server 8 is also illustrated.

SUMMARY

Selection of a CGW in cases where a MD has access to several CGWs is an aspect for which satisfactory control mechanisms are lacking. Presently, the MDs use some kind of channel quality measure or link metric when selecting the CGW, but other selection mechanisms may be desired.

For example, the various MDs of a capillary network may have different requirements, e.g. owing to the MDs running different applications. Some MDs may be running highly crucial applications, while others are running more latency tolerant applications. The presently used mechanisms do not take into account e.g. such specific requirements of the MDs, and for the exemplary situation, the known CGW selection mechanism may lead to unnecessary delays for the crucial applications.

Other selection mechanisms may be desirable also from the point of view of the operator of the cellular network, e.g. for enabling best use of available resources while at the same time providing best possible service to their customers.

An object of the present teachings is to solve or at least alleviate at least one of the above mentioned short-comings of prior art.

The object is according to a first aspect achieved by a method for selecting a capillary network gateway for a machine device of a capillary network. The method comprises: acquiring a respective bearer service parameter for two or more capillary network gateways of the capillary network, each capillary network gateway being capable of data exchange between the machine device and a wireless network, and wherein the bearer service provides a backhaul connection in the wireless network, and selecting, for the machine device, a capillary network gateway based on the bearer service parameters.

The method enables an improved choice of capillary network gateway to be made by taking into account additional information when making a decision about which capillary network gateway to select for a machine device. The method further enables the operator of the wireless network to have at least some control of the machine device's choice of capillary network gateway, e.g. enabling steering machine devices to capillary network gateways with appropriate backhaul quality of service, whereby the need to have multiple bearers (with different quality of service) at each capillary network gateway may be avoided. This provides a cost advantage for the operator of the wireless network. In case the method is implemented in an LTE network, the bearer service parameter may comprise the quality of service associated with Evolved Packet System (EPS) bearers that are established (and/or may be established) for the capillary network gateway in the wireless network.

The object is according to a second aspect achieved by a node for selecting a capillary network gateway for a machine device of a capillary network. The node comprises a processor and memory, the memory containing instructions executable by the processor, whereby the node is operative to: acquire a respective bearer service parameter for two or more capillary network gateways of the capillary network, each capillary network gateway being capable of data exchange between the machine device and a wireless network, and wherein the bearer service provides a backhaul connection in the wireless network, and select, for the machine device, a capillary network gateway based on the bearer service parameters.

The object is according to a third aspect achieved by a computer program for a node for selecting a capillary network gateway for a machine device of a capillary network. The computer program comprises computer program code, which, when run on the node causes the node to: establish a respective bearer service parameter for two or more capillary network gateways of the capillary network, each capillary network gateway being capable of data exchange between the machine device and the wireless network the bearer service providing a backhaul connection in the wireless network; and select, for the machine device, the capillary network gateway based on the bearer service parameters.

The object is according to a fourth aspect achieved by a computer program product comprising a computer program as above, and a computer readable means on which the computer program is stored.

The object is according to a fifth aspect achieved by a node for selecting a capillary network gateway for a machine device of a capillary network. The node comprises: means for acquiring a respective bearer service parameter for two or more capillary network gateways of the capillary network, each capillary network gateway being capable of data exchange between the machine device and a wireless network, and wherein the bearer service provides a backhaul connection in the wireless network, and means for selecting, for the machine device, a capillary network gateway based on the bearer service parameters.

Further features and advantages of the present teachings will become clear upon reading the following description and the accompanying drawings.

DETAILED DESCRIPTION

Figure 1:
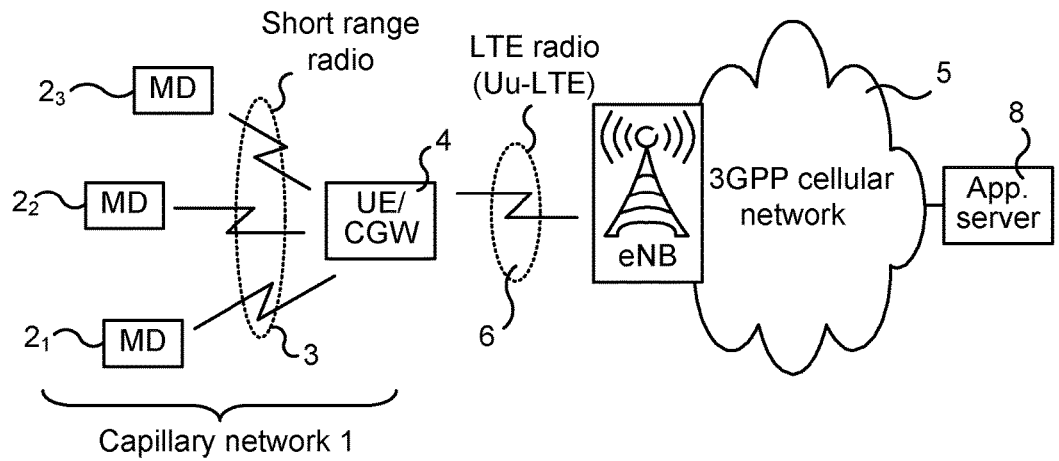
FIG. 1 illustrates schematically a capillary network and a cellular network.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
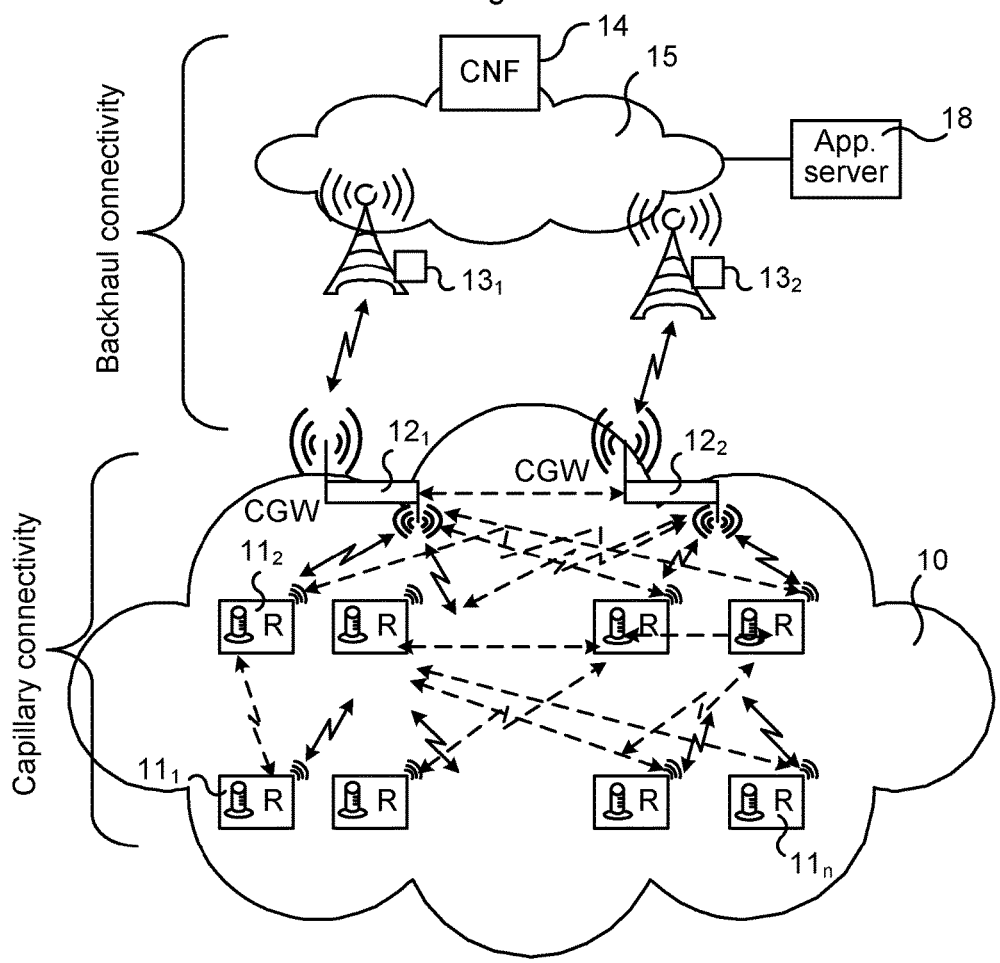
FIGS. 2 and 3 illustrate environments in which embodiments of the present disclosure may be implemented.

FIG. 2 illustrates an environment in which embodiments of the present disclosure may be implemented. It is initially noted that embodiments of the present disclosure are described and exemplified by using LTE as the radio access technology over the air interface between the CGW and the cellular network (also denoted wireless network in the following). The teachings of the present disclosure may however be applied also to other radio access technologies, such as e.g. Global System for Mobile Communications (GSM) or Universal Mobile Telecommunications System (UMTS).

A capillary network 10 comprises one or more machine devices (MDs) $12_1$, $12_2$, and one or more capillary network gateways (CGWs) $12_1$, $12_2$. The MDs $11_1$, $11_2$, ..., $11_n$ are capable to (e.g. configured to) communicate with the CGW $12_1$, $12_2$, and/or with other MDs $11_1$, $11_2$, ..., $11_n$ over a first air interface. The first air interface may implement a short range radio technology, such as for example IEEE 802.15.4 (e.g. with 6LoWPAN or ZigBee as the higher layers), Bluetooth Low Energy or low energy versions of the IEEE 802.11 family, (i.e. Wireless Local Area Networks, or WiFi). In FIG. 2, the communication over this first air interface is illustrated by the various arrows between the MDs $11_1$, $11_2$, ..., $11_n$ and between the MDs $11_1$, $11_2$, ..., $11_n$ and the CGWs $12_1$, $12_2$. The MDs $11_1$, $11_2$, ..., $11_n$ may for example comprise metering devices, actuators or sensors, e.g. electricity meters.

The CGWs $12_1$, $12_2$ are in turn capable to (e.g. configured to) communicate not only with the MDs $11_1$, $11_2$, ..., $11_n$ but also with a node $13_1$, $13_2$ of a wireless network 15 over a second air interface. When the wireless network 15 is an LTE network, the node may e.g. be an evolved node B (eNB), and the second air interface is then the LTE-Uu-interface. This communication over the second air interface is illustrated by the arrows between the CGWs $12_1$, $12_2$ and the nodes $13_1$, $13_2$ of the wireless network 15. The CGWs $12_1$, $12_2$ are thus interfacing both the MDs $11_1$, $11_2$, ..., $11_n$ and the wireless network 15. The wireless network 15 may comprise an LTE network, but may alternatively be another type of network, as mentioned earlier.

For the purposes of the present disclosure, the CGWs $12_1$, $12_2$ may generally, but not necessarily, be under the control of an operator of the wireless network 15 even though the operator of the wireless network 15 does not necessarily own the CGWs $12_1$, $12_2$.

Each CGW $12_1$, $12_2$ is configured with one or more Evolved Packet System (EPS) bearers. The EPS bearer provides a logical transmission path, a transport backhaul connection, between the CGW $12_1$, $12_2$ and a packet data network gateway (PDN-GW) of the wireless network 15 (reference is also made to FIG. 4, reference numeral 17). The backhaul connection thus connects the radio interface provided by the wireless network 15 with the core network of the wireless network 15. Each EPS bearer has a Quality of Service (QoS) class/parameters associated therewith. The QoS parameters describe the properties of the backhaul connection. Examples of such properties comprise bit rates (/data rate), packet delay, a parameter related to packet loss probability, packet delay variation. There are further parameters that may be related to, or associated with, the bearer, parameters that are not explicitly related to the properties of the backhaul connection as such, but still relevant. Examples of such parameter comprise cost related to the bearer service and cost in each of the respective capillary network gateways of providing a bearer service having a specified quality of service.

The capillary network 10 may be single hop network (refer to FIG. 3, which illustrates such case), i.e. all MDs $11_1$, $11_2$, ..., $11_n$ have a direct link to the CGW $12_1$, $12_2$. This is the case e.g. for a WiFi network with the CGWs $12_1$, $12_2$ acting as the access point towards the wireless network 15. The capillary network 10 may else, as illustrated in the FIG. 2, be a multi-hop network, i.e. some MDs $11_1$, $11_2$, ..., $11_n$ may have to communicate via one or more other MD(s) $11_1$, $11_2$, ..., $11_n$ to reach the CGW $12_1$, $12_2$. This is often the case e.g. for an IEEE 802.15.4+ZigBee network with the CGW $12_1$, $12_2$ acting as a Personal Area Network (PAN) controller. Aspects of the present disclosure are applicable to both such set-ups of the capillary network 10. In the multi-hop case, a routing protocol, such as Routing Protocol for Low-Power and Lossy Networks (RPL), may be used. It is noted that the RPL may, in principle, be used also in single hop networks, although there is typically no need for a routing protocol in such networks.

An application server 18 is also illustrated in FIG. 2. The application server 18 may be part of the cellular network 5, or be part of another network connected to the cellular network 5. Such other network may e.g. comprise a third party service provider's network (e.g. owned by a service provider other than the operator of the cellular network 5). The application server 18 comprises applications which may configure the MDs $11_1, 11_2, \ldots, 11_n$ to e.g. perform a certain action such as perform a reading and send a reading value to it.

According to an aspect of the present disclosure, a Capillary Network Function (CNF) is introduced, illustrated schematically at reference numeral 14. A function of the CNF 14 is to select a CGW $12_1, 12_2$ for an MD 11, which selection will be described further with reference to FIG. 3. It is noted that although illustrated in the FIG. 3 as located in the wireless network 15, the selection functionality of the CNF 14 may alternatively be implemented in a node of the capillary network 10. In embodiments of the present disclosure wherein the CNF 14 is placed in the wireless network 10, there are several possible locations for it within the wireless network 10, which will be elaborated on with reference to FIG. 4. When the selection functionality is implemented in the wireless network 15, the selection functionality is referred to as CNF 14, the CNF 14 e.g. being a standalone node in the wireless network or integrated with an existing node of the wireless network. When the selection functionality is implemented in a node of the capillary network 10 it is simply referred to as selection functionality.

Figure 3:
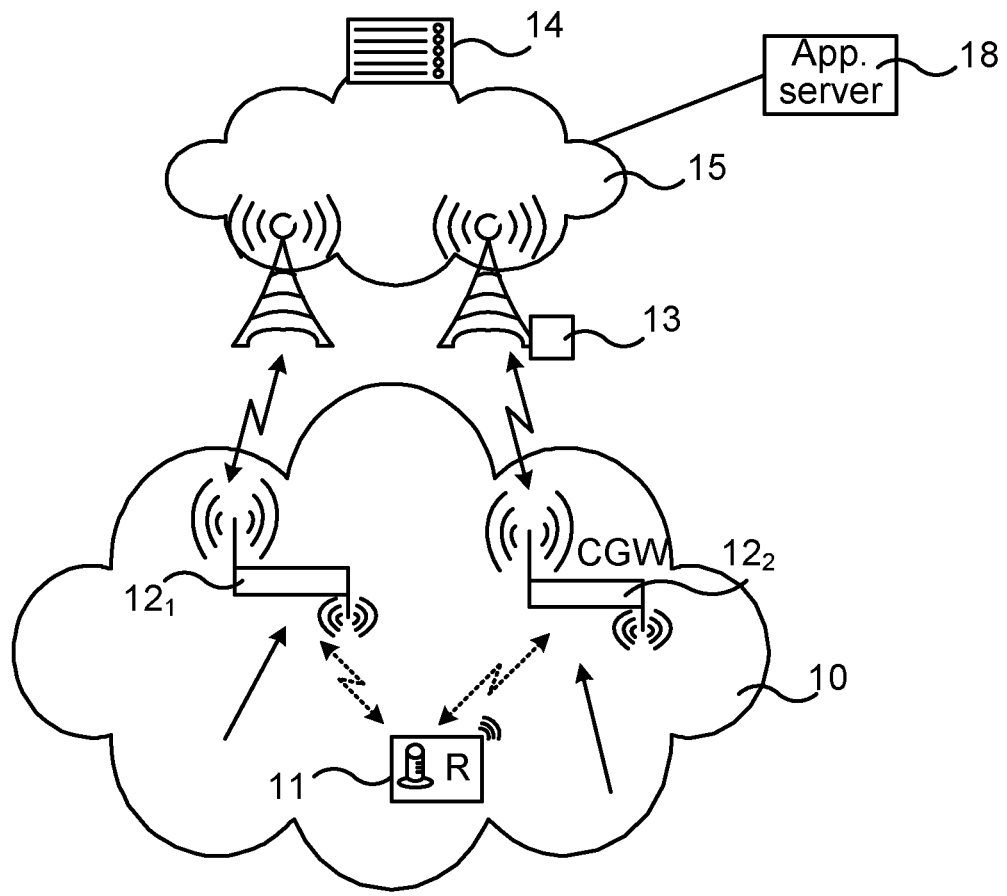

FIG. 3 illustrates an environment in which embodiments of the present disclosure may be implemented. FIG. 3 is similar to FIG. 2, but simplified in that only one MD 11 is illustrated and in that it is a single-hop capillary network 10.

As mentioned earlier, control mechanisms for selecting one out of several CGWs $12_1, 12_2$ that are available to an MD 11 is an area in which solutions are lacking. The current mechanism is typically that the MD 11 uses some kind of channel quality measure/link metric as the basis for the choice of CGW $12_1, 12_2$, but there are situations in which other mechanisms are desirable. For example, the various MDs 11 of the capillary network 10 may have different requirements, e.g. owing to the MDs 11 being configured with and occasionally running different applications. Some MDs 11 may be running highly crucial applications, while others are running more latency tolerant applications. The presently used mechanisms do not take into account e.g. such specific requirements of the MDs 11, and for the exemplary situation, the known CGW selection mechanism may lead to unnecessary delays for the crucial applications, since, although the link between the MD 11 and the CGW $12_1, 12_2$ may be the best possible, there may be e.g. congestion on the remaining path to an end point entity communicating with the MD 11.

Several properties, or characteristics, that can be associated with a CGW $12_1, 12_2$ may be relevant for impacting the choice of CGW $12_1, 12_2$ for a particular MD 11. In the present disclosure, a CGW characteristic that is primarily considered is the available quality of service (QoS) on a backhaul connection. For the case of the wireless network 15 being an LTE system, the available QoS associated with EPS bearers that are established (and/or may be established) for the CGW $12_1, 12_2$ in the wireless network 15 is the CGW characteristic mainly considered. In other cellular systems than LTE the corresponding features should be considered instead. For instance, in a UMTS network it would be the QoS associated with the Packet Data Protocol (PDP) context constituting the bearer that provides the backhaul from the CGW.

Even though the MD 11 itself eventually and inevitably is the entity that executes the CGW selection, e.g. in terms of association with a certain CGW, it would be advantageous to allow the wireless network 15 to maintain some level of control or at least influence over the MD's 11 choice. This control may come in the shape of explicit instructions, policies/rules based on contextual input parameters, and/or modification of contextual parameters that may indirectly affect the MD's 11 choice of CGW $12_1, 12_2$.

The capillary network functionality CNF 14 is a new functionality provided by the present disclosure. The CNF 14 is intended to handle various tasks related to the capillary network 10 and in particular the CGW $12_1, 12_2$. Such tasks may comprise e.g. configuration of the CGWs $12_1, 12_2$ and the CNF 14 may also to some extent be involved in traffic processing.

The CNF 14 is capable of providing an improved selection of a CGW $12_1, 12_2$ for the MD 11, in particular addressing the above described aspects of the selection. In the selection of a CGW $12_1, 12_2$, one or more bearer service parameters of a bearer service are taken into account, wherein the bearer service provides a backhaul connection in the wireless network 15. In various embodiments, the available QoS on a backhaul connection of the wireless network 15 is taken into account in the selection. In the following, the one or more bearer service parameters are often referred to as a single bearer service parameter, but it is noted that this single parameter may actually represent a set of multiple parameters. Moreover, the bearer service parameter is often exemplified by the QoS on the backhaul connection, but it is realized that other parameters could be used as well, as has been mentioned earlier.

In order for this available QoS on the backhaul connection (also denoted backhaul QoS in the following) to be considered in the choice of CGW CGW $12_1, 12_2$, information about the backhaul QoS available for each of the CGWs $12_1, 12_2$ of the capillary network 10 has to be gathered. In short, in order to provide input to the CNF 14 making the CGW selection this information needs to be obtained. The wireless network 15 may exercise its control over the CGW selection either directly as explicit instructions or indirectly using configurable rules and/or policies and/or by modifying contextual parameters that may indirectly affect the MD's 11 choice of CGW. Depending on how and by which entity the selection decision is made (i.e. where the selection functionality is implemented) and the way the wireless network 15 exercises its control over the MD's CGW choice, the information gathering may be performed in different ways and by different entities, which will be described in the following.

First, embodiments are described wherein the wireless network 15 exercises its control through explicit instructions regarding the selection. In these embodiments thus, the wireless network 15 exercises its control over the MD's choice of CGW $12_1, 12_2$ through explicit instructions to the MD 11 to select a certain CGW $12_1, 12_2$. The instructions may be provided in different ways, e.g. as an instruction to the MD 11 to connect/associate with another CGW than the currently used CGW. The instruction may e.g. be sent to the MD 11 by the MD's 11 current CGW or by the CNF 14. In the latter case a message containing the instruction traverses the CGW, but it is addressed directly to the MD and is opaque to the CGW.

In one embodiment, the CGWs $12_1$, $12_2$ exchange information about their respective available backhaul QoS, directly across the capillary network 10, i.e. over the air interface (e.g. Bluetooth) used within the capillary network 10. The CGWs $12_1$, $12_2$ thus communicate their respective backhaul QoS to one another, i.e. a particular CGW sends its backhaul QoS information to all other CGWs and, correspondingly receives, from all the other CGWs their respective backhaul QoS information.

In this embodiment, the selection functionality may be implemented in each CGW $12_1$, $12_2$, so that each CGW $12_1$, $12_2$ is able to perform the selection. In particular, each CGW $12_1$, $12_2$ will come to the same result about which CGW $12_1$, $12_2$ to select for a particular MD 11. This result may be then, as mentioned, be provided to the MD 11 as an explicit instruction to select (and eventually connect to) the CGW $12_1$, $12_2$ that results from the selection procedure. The explicit instruction may be sent by its current CGW, if the MD 11 already has a selected CGW, or by any CGW$12_1$, $12_2$ in the capillary network 10 if the MD 11 has no current GGW, e.g. the one that has been selected for use by the MD 11. Thus, the CGW$12_1$, $12_2$ to which the MD 11 is currently connected or associated with may send an instruction to the MD 11 to connect/associate with a certain alternative CGW (provided that it is not determined that the MD should remain with the current CGW). The CGW $12_1$, $12_2$ may send such instruction in the form of a field in a RPL message, as a link layer (management) message or as a parameter in a unicast IPv6 router advertisement. Still other possibilities comprise sending the instruction in e.g. a Constrained Application Protocol (CoAP) message or an Open Mobile Alliance Lightweight Machine to Machine (OMA-LWM2M) message.

In another embodiment, each CGW $12_1$, $12_2$ sends its respective backhaul QoS information to a CNF 14 located in the wireless network 15. The CNF 14 in turn may distribute the information to the other CGWs $12_1$, $12_2$ being part of the same capillary network 10, which CGWs $12_1$, $12_2$ may, as above, also comprise the selection functionality. The CNF 14 may be implemented as an entity in the wireless network 15, e.g. implemented integrated in an existing node of the wireless network 15 or as a standalone node in the wireless network 15. In some embodiments, the CNF 14 may perform the selection based on the information received from the CGWs $12_1$, $12_2$ and then send, via a CGW of the capillary network 10, explicit instruction to the MD 11 to select (and eventually connect to) the CGW $12_1$, $12_2$ resulting from the selection. The CNF 14 may alternatively send such instruction directly to the MD 11. In the latter case, again, the message containing the instruction traverses the CGW, but it is addressed directly to the MD and is opaque to the CGW.

Alternatively, the CNF 14 located in the wireless network 15, may be inherently aware of the backhaul QoS that is available to the different CGWs $12_1$, $12_2$, e.g. because the CNF 14 may have configured or instructed the CGWs $12_1$, $12_2$ to establish their respective EPS bearers, and is thereby able distribute this information to the CGWs $12_1$, $12_2$ of the same capillary network 10. Either way, the result of this information exchange/distribution is that all the CGWs $12_1$, $12_2$ connected to the same capillary network 10 will, again, be aware of the backhaul QoS available at all the other CGWs $12_1$, $12_2$ and hence, in this embodiment, any of the CGWs $12_1$, $12_2$, provided with the selection functionality, is thereby able to determine which CGW the MD 11 should select, and eventually connect/associate with.

In the selection procedure, the selection making entity, e.g. the CNF 14 or a CGW $12_1$, $12_2$, may also take into account information about the MD 11 and/or the application the MD is running. The selection making entity may e.g. derive such information from observing and sniffing traffic to/from the MD 11 or from explicit information received from the MD 11.

In another embodiment, the MD 11 has a relation with the CNF 14, or at least the MD 11 is visible and reachable from the CNF 14, which is implemented in the wireless network 15 or in a CGW $12_1$, $12_2$ in the capillary network 10. In this embodiment, the CNF 14 either gathers the backhaul QoS information from the CGWs $12_1$, $12_2$ or is inherently aware of it, as described above. Based on this information and possibly information about the MD 11 and the application it is running, the CNF 14 determines whether a MD 11 should change to another CGW and, if so, sends an explicit instruction directly to the MD 11 to select another CGW, or via a CGW if the CNF 14 is implemented in the wireless network 14. The CNF 14 may acquire information about the MD 11 and/or its application from the MD 11 or the application server 18 comprising a corresponding application or by observing and sniffing the MD's traffic (provided that all the MD's user data traffic passes through the CNF 14).

In a variation of this embodiment, the CNF 14 may, when implemented in the wireless network 15, send the instruction to the MD's current CGW instead of directly to the MD, requesting the current CGW to send an instruction to the MD.

Irrespective of where the CNF functionality is implemented, i.e. in the CGW, as a standalone CNF node in the capillary network 10, as a standalone node in the wireless network 15 or integrated with another entity or in the MD, the entity making the CGW selection decision on behalf of an MD 11 may, depending on the scenario, have to be provided with information about the CGWs $12_1$, $12_2$ that are currently reachable by the MD 11 and possibly also other contextual parameters such as the MD's channel quality to different CGWs.

Alternatively, the MD 11 may be configured to obey a received CGW selection instruction only if the CGW $12_1$, $12_2$ it is directed to is available to the MD 11 (or reachable with a reasonable channel quality).

Yet another alternative is that the instruction has the form of a number of CGWs $12_1$, $12_2$ listed in priority order, so that if the first CGW in the list is unavailable, or has too poor channel quality, the MD 11 chooses the next CGW in the list, and so on.

Next, embodiments are described wherein the wireless network 15 exercises its control over the MD's choice of CGW $12_1$, $12_2$ indirectly through policies and/or rules and contextual parameters. The selection functionality may thus be implemented in the MD 11, which is configurable with these policies/rules so that it selects a CGW based e.g. on the backhaul QoS thereof while obeying the policies/rules.

These policies/rules may be configured in the MD 11 by a node in the wireless network 15, e.g. an Operation and Maintenance (O&M) entity, or via a CNF 14 that is provided in the wireless network 15. If the O&M entity or CNF 14 does not have a direct relation to the MD 11, the configuration data may be sent first to the CGW $12_1$, $12_2$ to be forwarded to the MD 11. In this case one option is that all MDs 11 in the capillary network 10 are configured with the same policies/rules. However, individually adapted policies/rules are preferable in most cases in order to allow different kinds of MDs 11 and/or applications in the same capillary network 10. One way to achieve individual policy/rule adaptation without sending individual policies/rules to the various different MDs 11, thus causing much data to be sent, is to take the type of MD 11 and/or application into account in the policies/rules, i.e. making the type of MD and/or application a contextual parameter to be part of the input data to the policies/rules.

As implied above, the policies/rules may take contextual parameters as input data to an algorithm (selection functionality) that outputs a CGW selection. The input data comprises the available CGWs $12_1$, $12_2$, information reflecting their respective backhaul QoS, wherein a CGW may be available to one MD 11 but not to another within the same capillary network 10. The input data may also comprise contextual parameters including other aspects, such as channel quality, required transmission power, battery/energy status, location or capillary network technology used by the various CGWs $12_1$, $12_2$. For instance, a policy/rule may be formulated such that the MD 11 should switch to a certain CGW $12_1$, $12_2$ having more suitable backhaul QoS, but only if the channel quality is good enough. If the battery/energy status of the MD 11 is poor the policy/rule may state that any change of CGW $12_1$, $12_2$ is subject to the required transmission power, e.g. the policy/rule is not allowing increased required transmission power to be used. One or more such contextual parameters, combined in different ways, may be taken into account when making the selection.

In the various embodiments described, information about the backhaul QoS of each CGW $12_1$, $12_2$ may be sent from the CGW $12_1$, $12_2$ to the MD 11 in the form of a field in a RPL message, as a link layer message, e.g. a field in a beacon message, or as a parameter in a unicast IPv6 router advertisement. This information may comprise explicit descriptions of the QoS class/parameters of each EPS bearer associated with each CGW, but it may alternatively comprise information in more condensed forms, e.g. as a preference value. In this context "preference value" is intended as a generic designation for a parameter, the purpose of which is to reflect how "attractive" a CGW should be considered in a CGW selection procedure. The preference value should in some sense summarize one or more or all relevant properties/capabilities of the CGW, comprising at least the backhaul QoS and possibly also other properties and even more dynamic properties like the current load of each CGW.

Each CGW $12_1$, $12_2$ may create the backhaul QoS information and/or derivatives thereof independently of the other CGWs $12_1$, $12_2$, including setting of a possible preference value. However, an alternative is that the CGWs $12_1$, $12_2$ are made aware of each other's backhaul QoS, in any of the manners described above, and derives backhaul QoS information and/or derivatives thereof to be sent to the MD(s) 11, e.g. preference values, in a process where the backhaul QoS of all CGWs $12_1$, $12_2$ are taken into account, e.g. to derive relative preference values. In variations, the CNF 14 functionality provided in the wireless network 15 provides the CGWs $12_1$, $12_2$ with the condensed backhaul QoS information, e.g. preference values, which they should deliver to the MDs 11, upon which the selection functionality in the MDs 11 performs the CGW selection. Yet another option is that the CNF entity in the wireless network 15 sends the information directly to the MDs 11.

Figure 4:
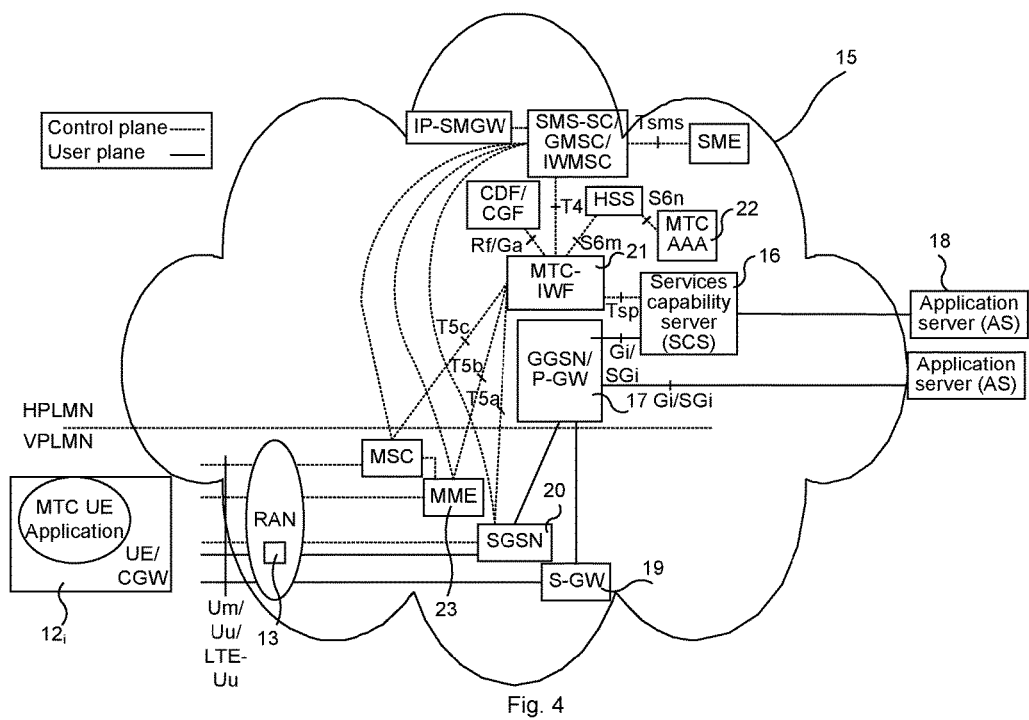
FIG. 4 illustrates a wireless network in which embodiments of the present disclosure may be implemented.

In the embodiments where the CNF 14, implemented in the wireless network 15, has to know the backhaul QoS of the CGWs $12_1$, $12_2$, the CNF 14 may, partly depending on deployment scenario, receive this information from the CGW $12_1$, $12_2$, the O&M system, a Packet Data Network Gateway (PGW) 17, a Mobility Management Entity (MME) 23 or it may know this inherently (also refer to FIG. 4 and related description). Inherent awareness and information retrieval from the CGWs have been described earlier. The O&M system, e.g. a MD/CGW/capillary network specific O&M entity may be aware of the CGWs' $12_1$, $12_2$ QoS, e.g. by retrieving this information from the CGWs $12_1$, $12_2$ or by being the source of configuration of the CGWs, such that it inherently knows the backhaul QoS of the CGWs. In either case, the O&M entity may inform the CNF 14. The CNF 14 may also have an interface towards the PGW 17 or the MME 23 and retrieve the information from either of these nodes, since both these nodes maintain information about the EPS bearers of the CGWs $12_1$, $12_2$, including the QoS associated with the EPS bearers. The MME 23 is a particularly interesting alternative if the CNF 14 is integrated in a Services Capability Server (SCS) 16, in which case the Tsp interface (between the SCS 16 and a Machine Type Communication Inter Working Function, MTC-IWF, node 21) and the T5b interface (between the MTC-IWF 21 and the MME 23) may be used (again, also refer to FIG. 4).

FIG. 4 illustrates a wireless network in which embodiments of the present disclosure may be implemented, and in particular a schematic overview of an exemplifying wireless network 15 in which embodiments of the present disclosure can be implemented. The wireless network 15 illustrated in FIG. 4 is an LTE based network. It is noted that the terms "LTE" and "LTE based" system is here used such as to encompass both present and future LTE based systems, such as, for example, advanced LTE systems. It should be appreciated, and as mentioned earlier, that although FIG. 4 illustrates a wireless network 15 in the form of an LTE based system, the example embodiments described herein may also be utilized in connection with other wireless communication systems, such as e.g. GSM or UMTS, comprising nodes and functions that correspond to the nodes and functions of the wireless network 15 in FIG. 4.

The wireless network 15 comprises one or more base stations in the form of eNodeBs 13, operatively connected to a Serving Gateway (SGW) 19, in turn operatively connected to a Packet Data Network Gateway (PGW)/Gateway General Packet Service Support Node (GGSN) 17. It is noted that the P-GW and GGSN may alternatively be separate nodes. The SGW 19 routes and forwards user data packets over the S1-U interface, whilst also acting as the mobility anchor for the user plane during inter-eNodeB handovers and as the anchor for mobility between LTE and other 3rd Generation Partnership Project (3GPP) technologies (terminating S4 interface and relaying the traffic between 2G/3G systems and PGW). Among other things, the SGW manages and stores UE contexts (the CGW is acting as a UE towards the wireless network 15), e.g. parameters of the Internet Protocol (IP) bearer service, and network internal routing information. Further, the wireless network 15 may comprise a Serving General Packet Service Support Node (SGSN) 20, a Services Capability Server (SCS) 16, a Machine Type Communication Inter Working Function (MTC-IWF) node 21, and a MTC Authentication, Authorization and Accounting (AAA) node 22.

The PGW 17 provides connectivity for the CGW to external packet data networks (PDNs, not explicitly illustrated, but the application server 18 may be part of such PDN) by being the point of exit and entry of traffic for the CGW. A CGW may have simultaneous connectivity with more than one PGW for accessing multiple PDNs. The PGW 17 performs policy enforcement, packet filtering for each user, charging support, lawful Interception and packet screening. Another key role of the PGW17 is to act as the anchor for mobility between 3GPP and non-3GPP technologies such as WiMAX and 3GPP2 (CDMA 1× and EvDO). The interface between the PGW 17 and the packet data network, being for instance the Internet, is referred to as the SGi. The packet data network may be an operator external public or private packet data network or an intra operator packet data network, e.g. for provision IP Multimedia Subsystem (IMS) services.

For the case that the selection functionality is implemented in the wireless network 15 (being an LTE network), i.e. in CNF 14, the CNF 14 preferably resides above the SGi interface and is further assumed to be reachable from the CGW $12_1$, $12_2$ via the user plane (user plane indicated in the FIG. 4 by solid lines). The CNF 14 may also have one or more interfaces to one or more O&M entities, e.g. O&M entities dedicated for CGWs, MDs and/or capillary networks 10.

Embodiments of the present disclosure may for example be implemented in the SGW 19, the GGSN/PGW17 or the eNodeB 13, the SGSN 20, the SCS 16, a Radio Network Controller (RNC), or a NodeB in a Universal Mobile Telecommunication System, UMTS, network, or an SGSN 20, a GGSN, a Base Station Controller (BSC), or a Base Transceiver Station (BTS) in a Global System for Mobile communications (GSM) network. The CNF 14 may be implemented in the SCS 16, the MTC-IWF 21 node or the MTC AAA node 22. The CNF 14 may thus be located with any of the mentioned nodes or yet others, i.e. integrated with the node or as a part of the node. In other embodiments, the CNF 14 is deployed as a separate entity.

Above, only exemplary nodes wherein embodiments of the present disclosure may be implemented are provided. As is well known, the wireless network 15 comprises a number of additional nodes, such as Mobility Management Entity (MME) 23, involved in various task, for example in the bearer activation/deactivation process and is also responsible for choosing the SGW 19 for a CGW at the initial attach and at time of intra-LTE handover involving core network node relocation. Such additional nodes are illustrated in FIG. 4, but not described further herein. In the following, a node of the wireless network 15 is referred to by reference numeral 30, and may thus comprise any one of the mentioned nodes or corresponding nodes of other communication systems.

Figure 5:
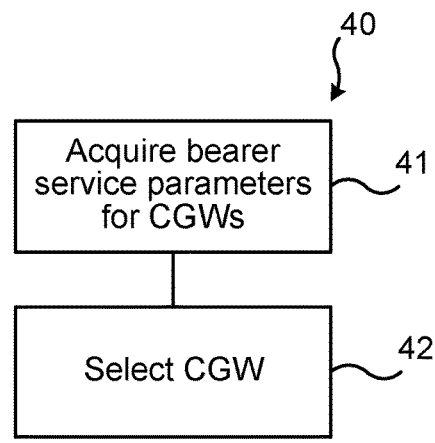
FIG. 5 illustrates a flow chart over steps of a method in a node in accordance with the present disclosure.

FIG. 5 illustrates a flow chart over steps of a method 40 in a node in accordance with the present disclosure.

The method 40 is used for selecting a capillary network gateway $12_1$, $12_2$ for a machine device 11 of a capillary network 10. The method 40 comprises acquiring 41 a respective bearer service parameter for two or more capillary network gateways $12_1$, $12_2$ of the capillary network 10. The acquiring 41 may be adapted e.g. to and in view of the node in which the method 40 is performed. Each capillary network gateway $12_1$, $12_2$ is capable of data exchange between the machine device 11 and a wireless network 15, and the bearer service provides a backhaul connection in the wireless network 15. The capillary network gateway $12_1$, $12_2$ may be capable of the data exchange by being provided with a first interface enabling communication with the machine device 11 and with a second interface enabling communication with the wireless network 15. For example, the first interface may comprise a protocol stack relevant for the radio access technology used in the capillary network 10, and correspondingly, the second interface may comprise a protocol stack relevant for the radio access technology used in the wireless network 15.

The method 40 comprises selecting 42, for the machine device 11, a capillary network gateway $12_1$, $12_2$ based on the bearer service parameters. The selecting 43 may in particular be based on QoS of the backhaul connection, wherein the CGW having the most appropriate QoS backhaul for a certain MD 11 is selected. The resulting selection of capillary network gateway $12_1$, $12_2$ may be effectuated by explicit instructions for the machine device 11 to select a certain capillary network gateway $12_1$, $12_2$, or by an indirect selection in that the machine device 11 is configured with rules or policies directing it to indeed select the certain capillary network gateway $12_1$, $12_2$.

The method 40 may be implemented in different nodes: in a node 30 of the wireless network 15, as a standalone node in the wireless network 15, as standalone node in the capillary network 10, in the CGW or in the MD 11. The node 30 of the wireless network 15 may be a SGW 19, a PGW/GGSN 17, an eNodeB 13, a SGSN 20, or a SCS 16.

Thus, the MD 11, or the CGW $12_1$, $12_2$ or a network node 30 or any other appropriate node, determines which CGW out of a plurality of CGWs should be selected on the basis of the bearer service parameters, e.g. the backhaul QoS available at the respective CGWs.

In an embodiment, the selecting 42 is further based on information relating to the machine device 11. This embodiment enables an improved choice of capillary network gateway by taking into account specific requirements of the machine device 11, for example requirements of the specific application run or to be run by the machine device 11, and matching such requirements to bearer service parameters of the capillary network gateways $12_1$, $12_2$ of the capillary network 10.

In a variation of the above embodiment, the information relating to the machine device 11 comprises requirements of an application configured in the machine device 11, and the selecting 42 comprises selecting the capillary network gateway $12_1$, $12_2$ having a bearer service parameter appropriate for the requirements of the application. The bearer service parameter may for example comprise a QoS associated with the backhaul connection provided by the bearer service. A bearer service parameter appropriate for the requirements of the application may then be a QoS that is sufficient for the application without providing exceedingly good QoS. An advantage with this embodiment is that it may enable steering the machine device 11 to a capillary network gateway $12_1$, $12_2$ with most appropriate backhaul QoS, which in turn may avoid the need to have several bearers, possibly with different QoS, at each capillary network gateway $12_1$, $12_2$. This need for several bearers could be the case if selecting capillary gateway in accordance with prior art: many machine devices may have the best link to the same capillary network gateway, which may therefore need to have several bearers to serve all machine devices.

In a variation of the above embodiment, the method 40 comprises deriving information about the application when run by the machine device 11 by parsing an incoming or outgoing machine device 11 message. According to this embodiment, adequate information for determining whether a bearer service parameter, e.g. backhaul QoS, is appropriate for the application is provided in a convenient way.

In an embodiment, the selecting 42 comprises selecting the capillary network gateway $12_1$, $12_2$ such that the bearer service parameter thereof is appropriate for requirements of the machine device 11. Such requirements may thus be other than the above application requirements, or may be requirements in addition to the application requirements.

In an embodiment, the method 40 comprises repeating the acquiring 41, and determining based thereon if a reselection of capillary network gateway $12_1$, $12_2$ is to be performed. A check may thus be performed periodically, regularly or from time to time on whether the selected capillary network gateway is still the one that should be used by the machine device. This embodiment may be seen as providing a check as to the capillary network gateway (still) being, in some sense, the best one to use, and if not, a reselection is to be made.

In an embodiment, the method 40 comprises instructing the machine device 11 to connect to the selected capillary network gateway $12_1$, $12_2$.

In a variation of the above embodiment, the instructing comprises sending a message to the machine device 11. The message may for example comprise a RPL message, a Constrained Application Protocol (CoAP) message, an Open Mobile Alliance Lightweight Machine to Machine (OMA-LWM2M) message, a unicast router advertisement, or a link layer message.

In variations of the above two embodiments, the instructing comprises providing a listing of the selected capillary network gateway $12_1$, $12_2$ and further capillary network gateways $12_1$, $12_2$ of the two or more capillary network gateways $12_1$, $12_2$, the listing providing a prioritized order instructing the machine device 11 to connect to one of the capillary network gateways $12_1$, $12_2$ in the prioritized order. In addition to the selected capillary network gateway $12_1$, $12_2$ e.g. all other capillary network gateways $12_1$, $12_2$ of the capillary network may be provided in a prioritized order. If the machine device, for some reason e.g. due to link quality, cannot connect to the selected capillary network gateway $12_1$, $12_2$ it may instead select the second highest prioritized capillary network gateway $12_1$, $12_2$. If this capillary network gateway $12_1$, $12_2$ is also unavailable, then the next highest prioritized capillary network gateway $12_1$, $12_2$ may be selected.

In an embodiment, the method 40 is performed in a capillary network gateway $12_1$.

In a variation of the above embodiment, the acquiring 41 comprises receiving a bearer service parameter from at least one other capillary network gateway $12_2$ of the capillary network 10 and obtaining a bearer service parameter for the capillary network gateway $12_1$ in which the method 40 is performed (e.g. retrieving the bearer service parameter from a memory thereof), and the selecting 42 comprises selecting the capillary network gateway $12_1$, $12_2$ having a bearer service parameter appropriate for an application configured in (and from time to time run by) the machine device 11. The selection may comprise evaluating the received one or more bearer service parameters and the bearer service parameter of the capillary network gateway $12_1$ in which the method 40 is performed in view of best meeting requirements of the application and the selecting 42 then be based on the evaluation.

In another embodiment, the method 40 is performed in a network node 13, 14, 16 of the wireless network 15.

In a variation of the above embodiment, the acquiring 41 comprises obtaining, in the network node 13, 14, 16, a respective bearer service parameter for the two or more capillary network gateways $12_1$, $12_2$. The obtaining may comprises: receiving, from each of the two or more capillary network gateways $12_1$, $12_2$ a respective bearer service parameter, or using information about the respective bearer service parameter available in the network node 13, 14, 16, or receiving, from one or more other network nodes 13, 14, 16 of the wireless network 15, a respective bearer service parameter for the two or more capillary network gateways $12_1$, $12_2$.

In another embodiment, the method 40 is performed in the machine device 11.

In a variation of the above embodiment, the acquiring 41 comprises receiving a respective bearer service parameter from the two or more capillary network gateways $12_1$, $12_2$.

The method 40, when performed in the machine device 11, may comprise receiving one or more rules or policies which should also be taken into account and fulfilled in the selecting 42, besides the bearer service parameter. In such embodiment, the selecting 42 may comprise selecting 42, for the machine device 11, a capillary network gateway $12_1$, $12_2$ based on the bearer service parameters, while fulfilling the one or more rules or policies. As a particular example, the rule may comprise a requirement of fulfilling a certain link quality metric and the selecting may then comprise selecting the capillary network gateway $12_1$, $12_2$ based on the bearer service parameters thereof, but under the requirement that the link quality between the machine device 11 and the capillary network gateway is equal to or better than the link quality metric defined by the rule.

In various embodiments, the selecting is further based on one or more of: channel quality and/or required transmission power of a channel between the machine device 11 and the two or more capillary network gateways $12_1$, $12_2$, energy status of the machine device 11, location of the two or more capillary network gateways $12_1$, $12_2$, radio technology used by the respective capillary network gateway $12_1$, $12_2$ in communication with the machine device 11.

In various embodiments, the bearer service parameter comprises one or more of: quality of service associated with an evolved packet system bearer, data rate, a parameter related to packet loss probability (e.g. maximum packet delay, packet delay variation), packet delay variation, cost related to the bearer service, cost in each of the two or more capillary network gateways $12_1$, $12_2$ of providing a bearer service having a specified quality of service.

Figure 6:
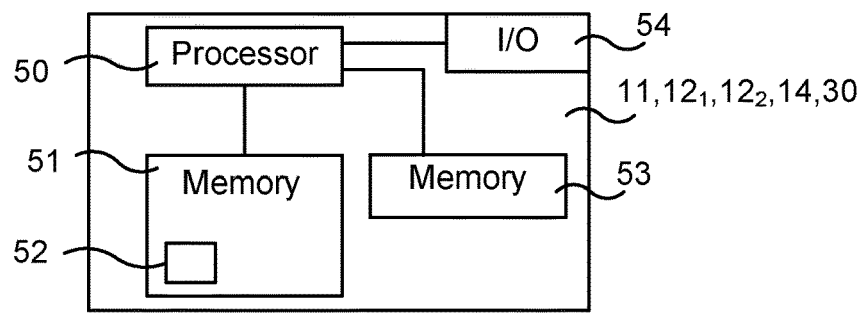
FIG. 6 illustrates schematically a node and means for implementing methods of the present disclosure.

FIG. 6 illustrates schematically a node 11; $12_1$, $12_2$; 14; 30 and means for implementing methods of the present disclosure. The node 11; $12_1$, $12_2$; 14; 30 comprises a processor 50 comprising any combination of one or more of a central processing unit (CPU), multiprocessor, microcontroller, digital signal processor (DSP), application specific integrated circuit etc. capable of executing software instructions stored in a memory 51, which can thus be a computer program product 51. The processor 50 can be configured to execute any of the various embodiments of the method as described, e.g. in relation to FIG. 5, or generally any of the functions as has been described.

The memory 51 can be any combination of read and write memory (RAM) and read only memory (ROM). The memory 51 also comprises persistent storage, which, for example, can be any single one or combination of magnetic memory, optical memory, solid state memory or even remotely mounted memory.

The node 11; $12_1$, $12_2$; 14; 30 may further comprise a data memory 53 for reading and/or storing data during execution of software instructions in the processor 50. The data memory 53 can be any combination of read and write memory (RAM) and read only memory (ROM).

The node 11; $12_1$, $12_2$; 14; 30 further comprises one or more input/output (I/O) devices 54 (only one illustrated) for communicating with other entities within the capillary network 10 and/or within the wireless network 15. For example, when the node comprises the CGW $12_1$, $12_2$, then the I/O 54 may comprise a first interface device for communication with the MDs 11 (e.g. a Bluetooth interface) and a second interface device for communication with the wireless network 15, and in particular an access node thereof, e.g. eNB 13, the second interface may thus comprise an LTE interface.

Depending on type of node, it may comprise still further means and devices, e.g. antenna circuitry if the node is an MD 11 or CGW $12_1$, $12_2$ or an access node (e.g. eNB 13).

Thus, the present disclosure provides a node 11; $12_1$, $12_2$; 14; 30 for selecting a capillary network gateway $12_1$, $12_2$ for a machine device 11 of a capillary network 10. The node 11; $12_1$, $12_2$; 14; 30 comprises a processor 50 and memory 51, the memory 51 containing instructions executable by the processor 50, whereby the node 11; $12_1$, $12_2$; 14; 30 is operative to:

acquire a respective bearer service parameter for two or more capillary network gateways $12_1$, $12_2$ of the capillary network 10, each capillary network gateway $12_1$, $12_2$ being capable of data exchange between the machine device 11 and a wireless network 15, and wherein the bearer service provides a backhaul connection in the wireless network 15, and select, for the machine device 11, a capillary network gateway $12_1$, $12_2$ based on the bearer service parameters.

In an embodiment, the node 11; $12_1$, $12_2$; 14; 30 is operative to select by further basing the selection on information relating to the machine device 11.

In a variation of the above embodiment, the information relating to the machine device 11 comprises requirements of an application configured in the machine device 11, and wherein the node 11; $12_1$, $12_2$; 14; 30 is operative to select the capillary network gateway $12_1$, $12_2$ having a bearer service parameter appropriate for the requirements of the application.

In a variation of the above embodiment, the node 11; $12_1$, $12_2$; 14; 30 is operative to derive information about the application when run by the machine device 11 by parsing an incoming or outgoing machine device 11 message.

In an embodiment, the node 11; $12_1$, $12_2$; 14; 30 is operative to select the capillary network gateway $12_1$, $12_2$ such that the bearer service parameter thereof is appropriate for requirements of the machine device 11.

In an embodiment, the node 11; $12_1$, $12_2$; 14; 30 is operative to repeat the acquiring 41, and operative to determine based thereon if a reselection of capillary network gateway $12_1$, $12_2$ is to be performed.

In an embodiment, the node 11; $12_1$, $12_2$; 14; 30 is operative to instruct the machine device 11 to connect to the selected capillary network gateway $12_1$, $12_2$.

In a variation of the above embodiment, the node 11; $12_1$, $12_2$; 14; 30 is operative to instruct by sending a message to the machine device 11.

In variations of the above two embodiments, the node 11; $12_1$, $12_2$; 14; 30 is operative to instruct by providing a listing of the selected capillary network gateway $12_1$, $12_2$ and further capillary network gateways $12_1$, $12_2$ of the two or more capillary network gateways $12_1$, $12_2$, the listing providing a prioritized order instructing the machine device 11 to connect to one of the capillary network gateway $12_1$, $12_2$ in the prioritized order.

In an embodiment, the node 11; $12_1$, $12_2$; 14; 30 is a capillary network gateway $12_1$.

In a variation of the above embodiment, the node 11; $12_1$, $12_2$; 14; 30 is operative to acquire by receiving a bearer service parameter from at least one other capillary network gateway $12_2$ of the capillary network 10 and obtaining a bearer service parameter for itself, and operative to select the capillary network gateway $12_1$, $12_2$ having a bearer service parameter meeting the requirements of an application configured in the machine device 11.

In an embodiment, the node 11; $12_1$, $12_2$; 14; 30 is a network node 14, 30 of the wireless network 15.

In a variation of the above embodiment, the node 11; $12_1$, $12_2$; 14; 30 is operative to acquire by obtaining, in the network node 14, 30, a respective bearer service parameter for the two or more capillary network gateways $12_1$, $12_2$.

In variations of the above embodiment, the node 11; $12_1$, $12_2$; 14; 30 is operative to obtain by:

receiving, from each of the two or more capillary network gateways $12_1$, $12_2$ a respective bearer service parameter, or using information about the respective bearer service parameter available in the network node 13, 14, 16, or receiving, from one or more other network nodes 13, 14, 16 of the wireless network 15, a respective bearer service parameter for the two or more capillary network gateways $12_1$, $12_2$.

In an embodiment, the node 11; $12_1$, $12_2$; 14; 30 is a machine device 11.

In a variation of the above embodiment, the node 11 is operative to acquire by receiving a respective bearer service parameter from the two or more capillary network gateways $12_1$, $12_2$.

In an embodiment, the node 11; $12_1$, $12_2$; 14; 30 is operative to select further based on one or more of: channel quality and/or required transmission power of a channel between the machine device 11 and the two or more capillary network gateways $12_1$, $12_2$, energy status of the machine device 11, location of the two or more capillary network gateways $12_1$, $12_2$, radio technology used by the respective capillary network gateway $12_1$, $12_2$ in communication with the machine device 11.

In an embodiment, the bearer service parameter comprises one or more of: quality of service associated with an evolved packet system bearer, data rate, a parameter related to packet loss probability, packet delay variation, cost related to the bearer service, cost in each of the two or more capillary network gateways ($12_1$, $12_2$) of providing a bearer service having a specified quality of service.

The present disclosure further provides a computer program 52 for a node 11; $12_1$, $12_2$; 14; 30 for selecting a capillary network gateway $12_1$, $12_2$ for a machine device 11 of a capillary network 10. The computer program 52 comprises computer program code, which, when run on the node 11; $12_1$, $12_2$; 14; 30 causes the node 11; $12_1$, $12_2$; 14; 30 to:

establish a respective bearer service parameter for two or more capillary network gateways $12_1$, $12_2$ of the capillary network 10, each capillary network gateway $12_1$, $12_2$ being capable of data exchange between the machine device 11 and the wireless network 15 the bearer service providing a backhaul connection in the wireless network 15, and select, for the machine device 11, the capillary network gateway $12_1$, $12_2$ based on the bearer service parameters.

The present disclosure further encompasses the earlier mentioned computer program product 51 comprising the computer program 52 as above, and a computer readable means on which the computer program 52 is stored.

The computer program product 51, or the memory, thus comprises instructions executable by the processor. Such instructions may be comprised in a computer program, or in one or more software modules or function modules.

Figure 7:
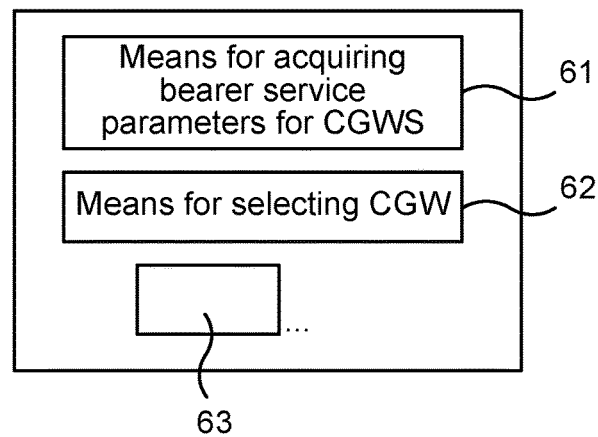
FIG. 7 illustrates a node comprising functions modules/software modules for implementing methods of the present disclosure.

An example of an implementation using function modules and/or software modules is illustrated in FIG. 7, in particular illustrating a node comprising such means for implementing embodiments of the described method. FIG. 7 thus illustrates a node for selecting a capillary network gateway $12_1$, $12_2$ for a machine device 11 of a capillary network 10. The node 11; $12_1$, $12_2$; 14; 30 comprises: first means 61 for acquiring a respective bearer service parameter for two or more capillary network gateways $12_1$, $12_2$ of the capillary network 10, each capillary network gateway $12_1$, $12_2$ being capable of data exchange between the machine device 11 and the wireless network 15, and the bearer service providing a backhaul connection in the wireless network 15. The node 11; $12_1$, $12_2$; 14; 30 comprises second means 62 for selecting, for the machine device 11, the capillary network gateway $12_1$, $12_2$ based on the bearer service parameters.

The first and second means 61, 62, e.g. functional modules, can be implemented using software instructions such as computer program executing in a processor and/or using hardware, such as application specific integrated circuits, field programmable gate arrays, discrete logical components etc.

The node 11; $12_1$, $12_2$; 14; 30 may comprise still further such means for implementing any of the embodiments of the method as has been described. For example, third means 63 may be provided for selecting by further basing the selection on information relating to the machine device 11. Such information relating to the machine device 11 may comprise requirements of an application configured in the machine device 11, and the node 11; $12_1$, $12_2$; 14; 30 may comprise means for selecting the capillary network gateway $12_1$, $12_2$ having a bearer service parameter appropriate for the requirements of the application.

Modifications of the disclosed embodiments and other embodiments will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for selecting a capillary network gateway for a machine device of a capillary network, the method comprising:
    acquiring a respective bearer service parameter for two or more capillary network gateways of the capillary network, each capillary network gateway being capable of data exchange between the machine device and a wireless network, and wherein the bearer service provides a backhaul connection that connects a radio interface provided by the wireless network with a core network of the wireless network, and
    selecting, for the machine device, a capillary network gateway based on the respective bearer service parameters for the respective bearer service that provides the backhaul connection.

2. The method as claimed in claim 1, wherein the selecting is further based on information relating to the machine device.

3. The method as claimed in claim 2, wherein the information relating to the machine device comprises requirements of an application configured in the machine device, and wherein the selecting comprises selecting the capillary network gateway having a bearer service parameter appropriate for the requirements of the application.

4. The method as claimed in claim 3, comprising deriving information about the application when run by the machine device by parsing an incoming or outgoing machine device message.

5. The method as claimed in claim 1, wherein the selecting comprises selecting the capillary network gateway such that the bearer service parameter thereof is appropriate for requirements of the machine device.

6. The method as claimed in claim 1, comprising instructing the machine device to connect to the selected capillary network gateway.

7. The method as claimed in claim 6, wherein the instructing comprises providing a listing of the selected capillary network gateway and further capillary network gateways of the two or more capillary network gateways, the listing providing a prioritized order instructing the machine device to connect to one of the capillary network gateway in the prioritized order.

8. The method as claimed in claim 1, wherein the method is performed in at least one of the capillary network gateways of the capillary network; and
    the acquiring comprises receiving a bearer service parameter from at least one other capillary network gateway of the capillary network and obtaining a bearer service parameter for the capillary network gateway in which the method is performed, and wherein the selecting comprises selecting the capillary network gateway having a bearer service parameter meeting the requirements of an application configured in the machine device.

9. The method as claimed in claim 1, wherein the method is performed in a network node of the wireless network; and the acquiring comprises obtaining, in the network node, a respective bearer service parameter for the two or more capillary network gateways.

10. The method as claimed in claim 9, wherein the obtaining comprises:
    receiving, from each of the two or more capillary network gateways a respective bearer service parameter, or
    using information about the respective bearer service parameter available in the network node, or
    receiving, from one or more other network nodes of the wireless network, a respective bearer service parameter for the two or more capillary network gateways.

11. The method as claimed in claim 1, wherein the method is performed in the machine device; and the acquiring comprises receiving a respective bearer service parameter from the two or more capillary network gateways.

12. A node for selecting a capillary network gateway for a machine device of a capillary network, the node comprising a processor and memory, the memory containing instructions executable by the processor, whereby the node is operative to:
    acquire a respective bearer service parameter for two or more capillary network gateways of the capillary network, each capillary network gateway being capable of data exchange between the machine device and a wireless network, and wherein the bearer service provides a backhaul connection that connects a radio interface provided by the wireless network with a core network of the wireless network, and
    select, for the machine device, a capillary network gateway based on the respective bearer service parameters for the respective bearer service that provides the backhaul connection.

13. The node as claimed in claim 12, operative to select by further basing the selection on information relating to the machine device.

14. The node as claimed in claim 13, wherein the information relating to the machine device comprises requirements of an application configured in the machine device, and wherein the node is operative to select the capillary network gateway having a bearer service parameter appropriate for the requirements of the application.

15. The node as claimed in claim 14, operative to derive information about the application when run by the machine device by parsing an incoming or outgoing machine device message.

16. The node as claimed in claim 12, operative to select the capillary network gateway such that the bearer service parameter thereof is appropriate for requirements of the machine device.

17. The node as claimed in claim 12, operative to repeat the acquiring, and operative to determine based thereon if a reselection of capillary network gateway is to be performed.

18. The node as claimed in claim 12, operative to instruct the machine device to connect to the selected capillary network gateway.

19. The node as claimed in claim 18, operative to instruct by providing a listing of the selected capillary network gateway and further capillary network gateways of the two or more capillary network gateways, the listing providing a prioritized order instructing the machine device to connect to one of the capillary network gateway in the prioritized order.

20. The node as claimed in claim 12, comprising a capillary network gateway and operative to acquire by receiving a bearer service parameter from at least one other capillary network gateway of the capillary network and obtaining a bearer service parameter for itself, and operative to select the capillary network gateway having a bearer service parameter meeting the requirements of an application configured in the machine device.

21. The node as claimed in claim 12, comprising a network node of the wireless network, and operative to acquire by obtaining, in the network node, a respective bearer service parameter for the two or more capillary network gateways.

22. The node as claimed in claim 21, operative to obtain by:
receiving, from each of the two or more capillary network gateways a respective bearer service parameter, or
using information about the respective bearer service parameter available in the network node, or
receiving, from one or more other network nodes of the wireless network, a respective bearer service parameter for the two or more capillary network gateways.

23. The node as claimed in claim 12, comprising a machine device, and operative to acquire by receiving a respective bearer service parameter from the two or more capillary network gateways.

24. The node as claimed in claim 12, operative to select further based on one or more of: channel quality and/or required transmission power of a channel between the machine device and the two or more capillary network gateways, energy status of the machine device, location of the two or more capillary network gateways, radio technology used by the respective capillary network gateway in communication with the machine device.

25. The node as claimed in claim 12, wherein the bearer service parameter comprises one or more of: quality of service associated with an evolved packet system bearer, data rate, a parameter related to packet loss probability, packet delay variation, cost related to the bearer service, cost in each of the two or more capillary network gateways of providing a bearer service having a specified quality of service.

* * * * *